June 5, 1956 — A. G. LAUTZENHISER ET AL — 2,749,498
WINDSHIELD WIPER CONTROL
Filed April 14, 1951 — 4 Sheets-Sheet 3

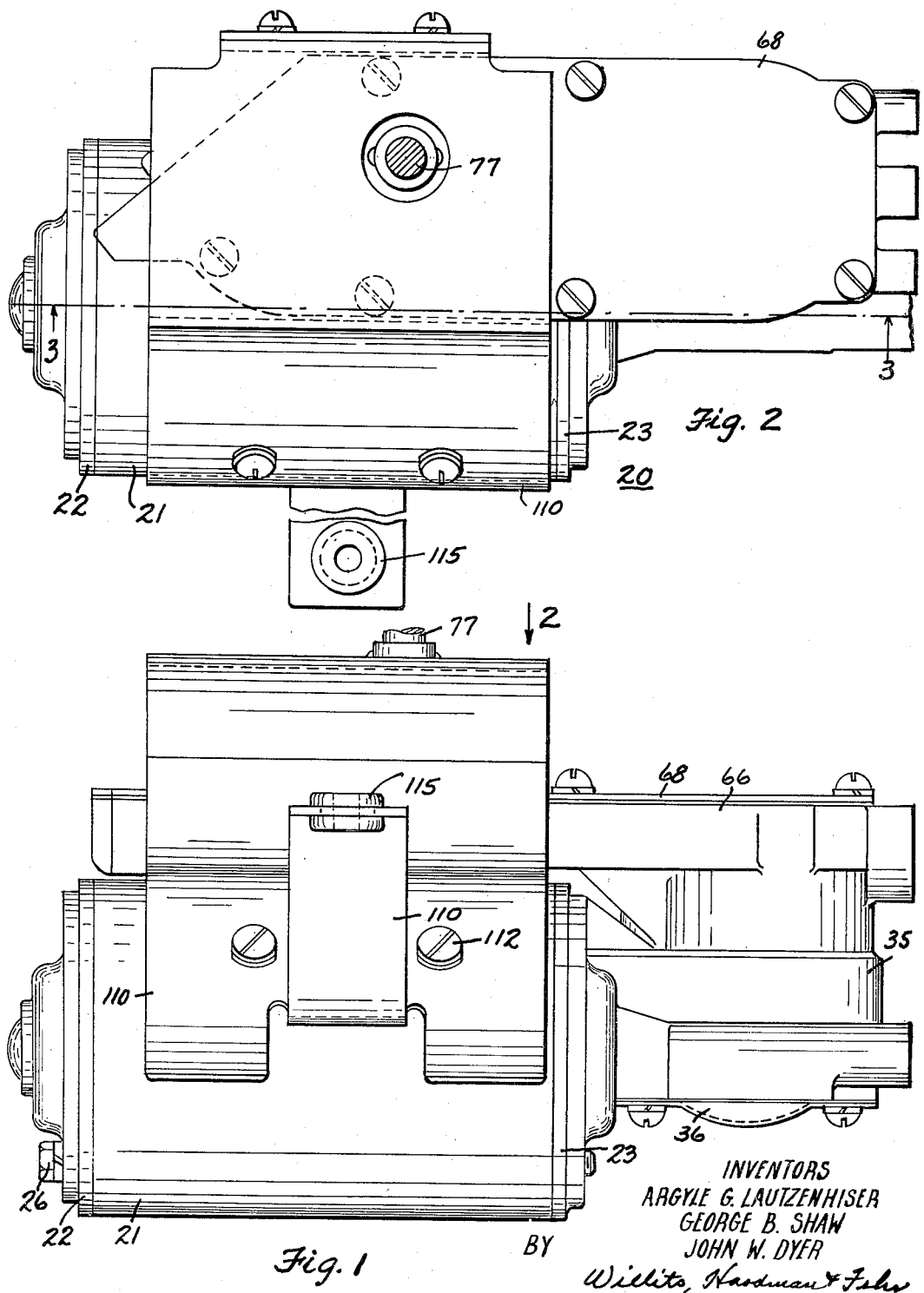

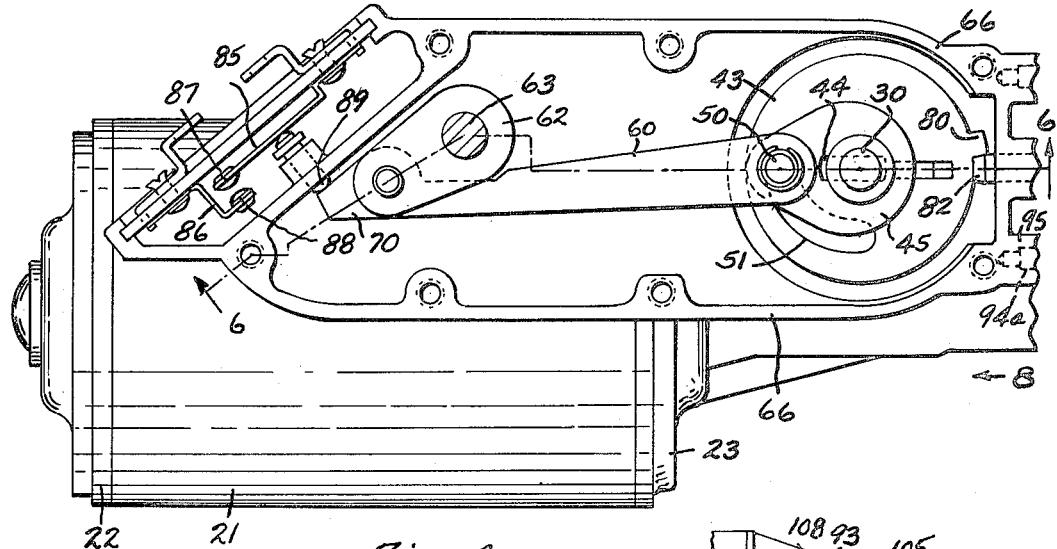
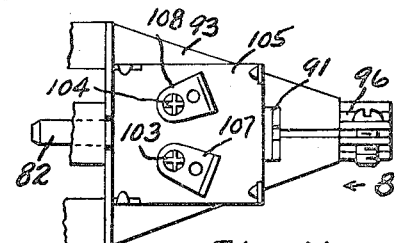
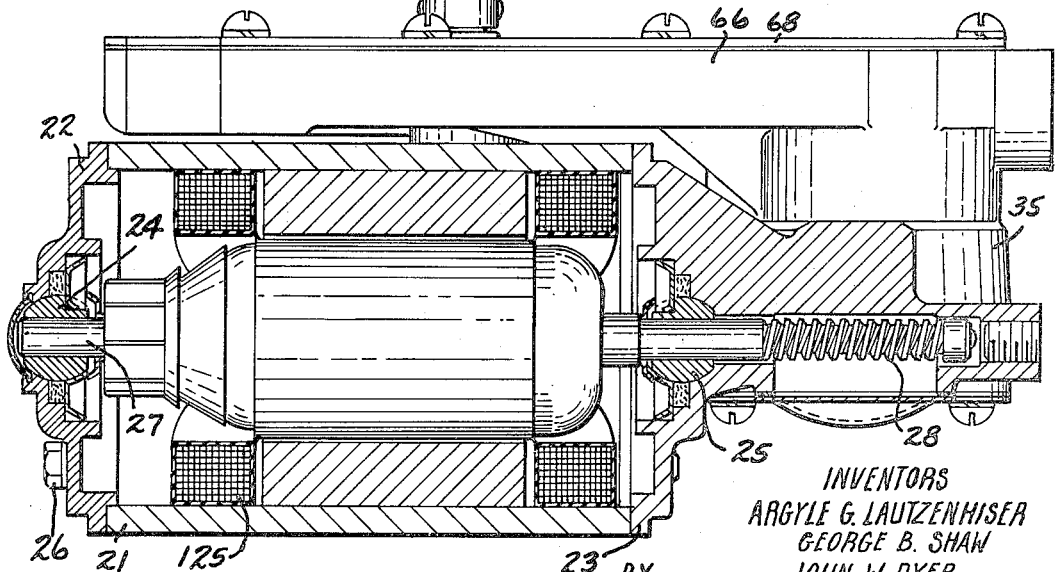

INVENTORS
ARGYLE G. LAUTZENHISER
GEORGE B. SHAW
JOHN W. DYER
BY Willits, Hardman & Fahr
THEIR ATTORNEYS

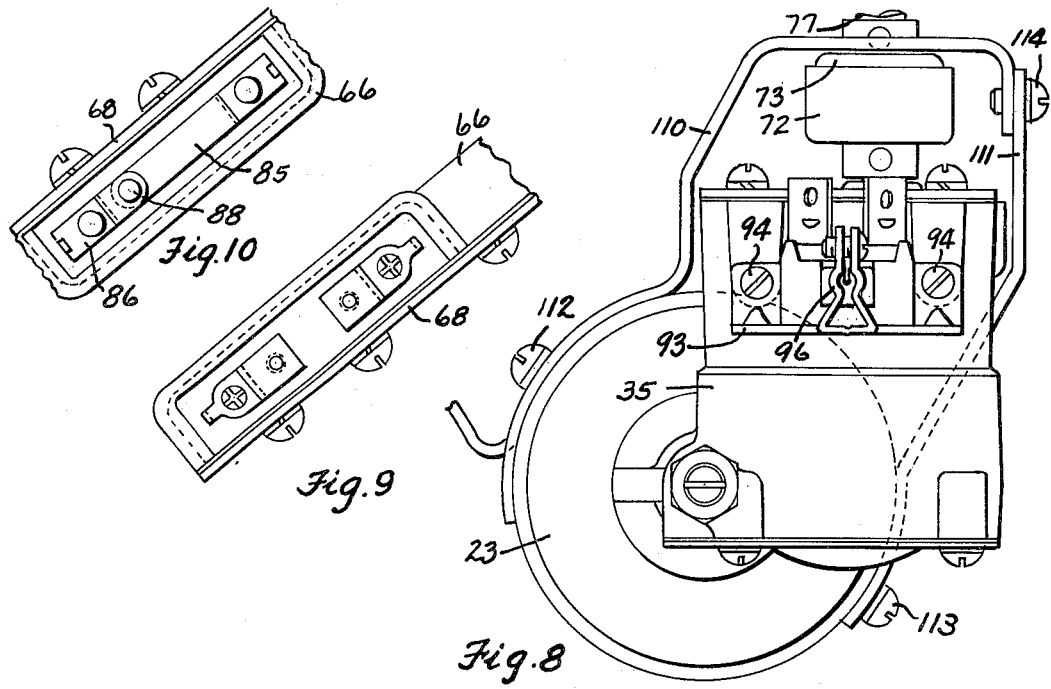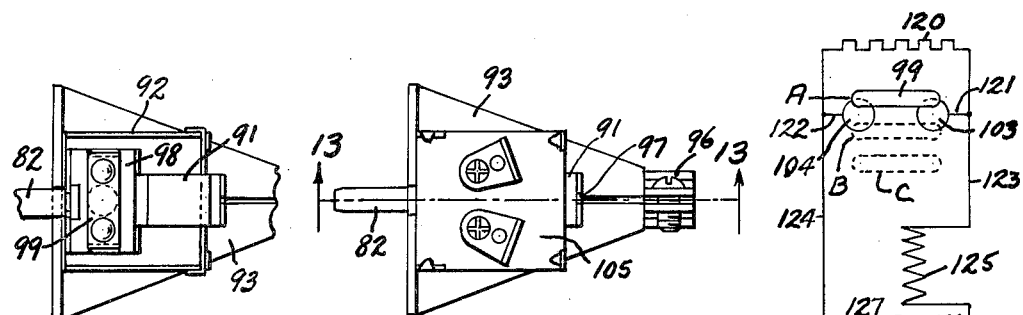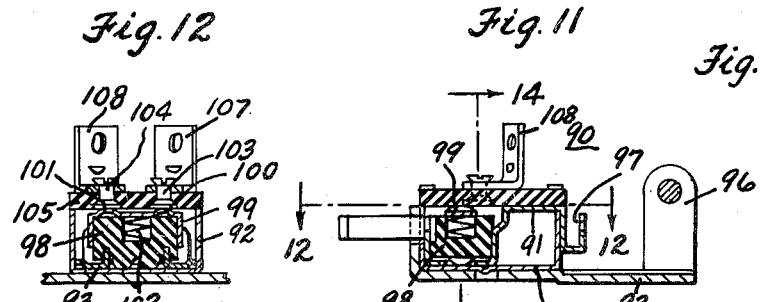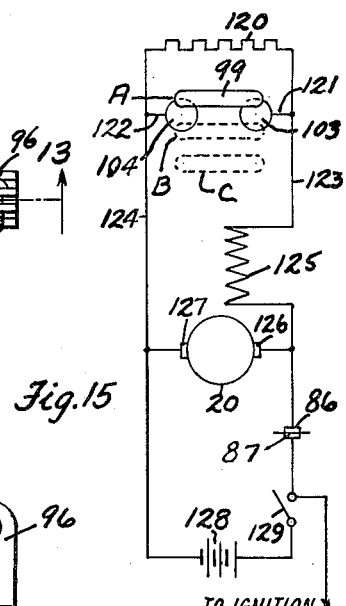

United States Patent Office 2,749,498
Patented June 5, 1956

2,749,498

WINDSHIELD WIPER CONTROL

Argyle G. Lautzenhiser and George B. Shaw, Anderson, and John W. Dyer, Pendleton, Ind., assignors to General Motors Corporation, Detroit, Mich., a corporation of Delaware Application April 14, 1951, Serial No. 221,048

12 Claims. (Cl. 318—466)

The present invention relates to windshield wipers and particularly to controls for mechanism whereby wiper blades may be parked in a predetermined position.

An object of the present invention is to provide certain improvements in the type of windshield wiper which include an electric motor, cam means, and switching means for causing the motor to rotate at either two selected speeds for causing the wiper blade to operate through a wiping range. When the switching means is operated to cause the motor to stop a manually operated device causes the cam to shift the blades to move to parking position and the circuit of the motor to be interrupted. Therefore the blades stop in parking position.

This object is accomplished by providing an electric motor having a worm which drives an eccentric cam which includes a spring windup thereon. The electric motor is controlled by a manually operated member which is inserted in the path of the cam which stops the cam and the motor continues to operate to wind up the spring associated with the cam whereupon final movement of an attached link will be moved into position to engage a plunger to separate the contacts of a normally closed switch and disconnect the motor from the current source so that the motor will stop and the wiping elements will stop in parking position.

Further objects and advantages of the present invention will be apparent from the following description, reference being had to the accompanied drawings wherein a preferred embodiment of the present invention is clearly disclosed.

In the drawings:

Fig. 1 is a side view of the motor construction embodying the present invention.

Fig. 2 is a top view of the motor construction looking in the direction of arrow 2 of Fig. 1.

Fig. 3 is a sectional view taken substantially on line 3—3 of Fig. 2.

Fig. 4 is a view similar to Fig. 2 with a cover removed and showing the switch which controls the energization of the motor in its open position.

Fig. 4A is a continuation of Fig. 4.

Fig. 8 is an end view looking in the direction of arrow 8 in Figs. 4 and 4A.

Fig. 9 is an end view of the motor control switch looking in the direction of arrow 9 in Fig. 4.

Fig. 10 is a view of the switch looking in the direction of arrow 10 in Fig. 4.

Fig. 11 is a top plan view of the switch shown in Fig. 4A removed from its supporting structure.

Fig. 12 is a view of the switch shown in Fig. 11 with the closure removed therefrom and taken on line 12—12 of Fig. 13.

Fig. 13 is a sectional view taken on line 13—13 of Fig. 11.

Fig. 14 is a sectional view taken on line 14—14 of Fig. 13.

Fig. 15 is a schematic wiring diagram showing the electric control embodied in the apparatus.

Figures 5, 6, 7:
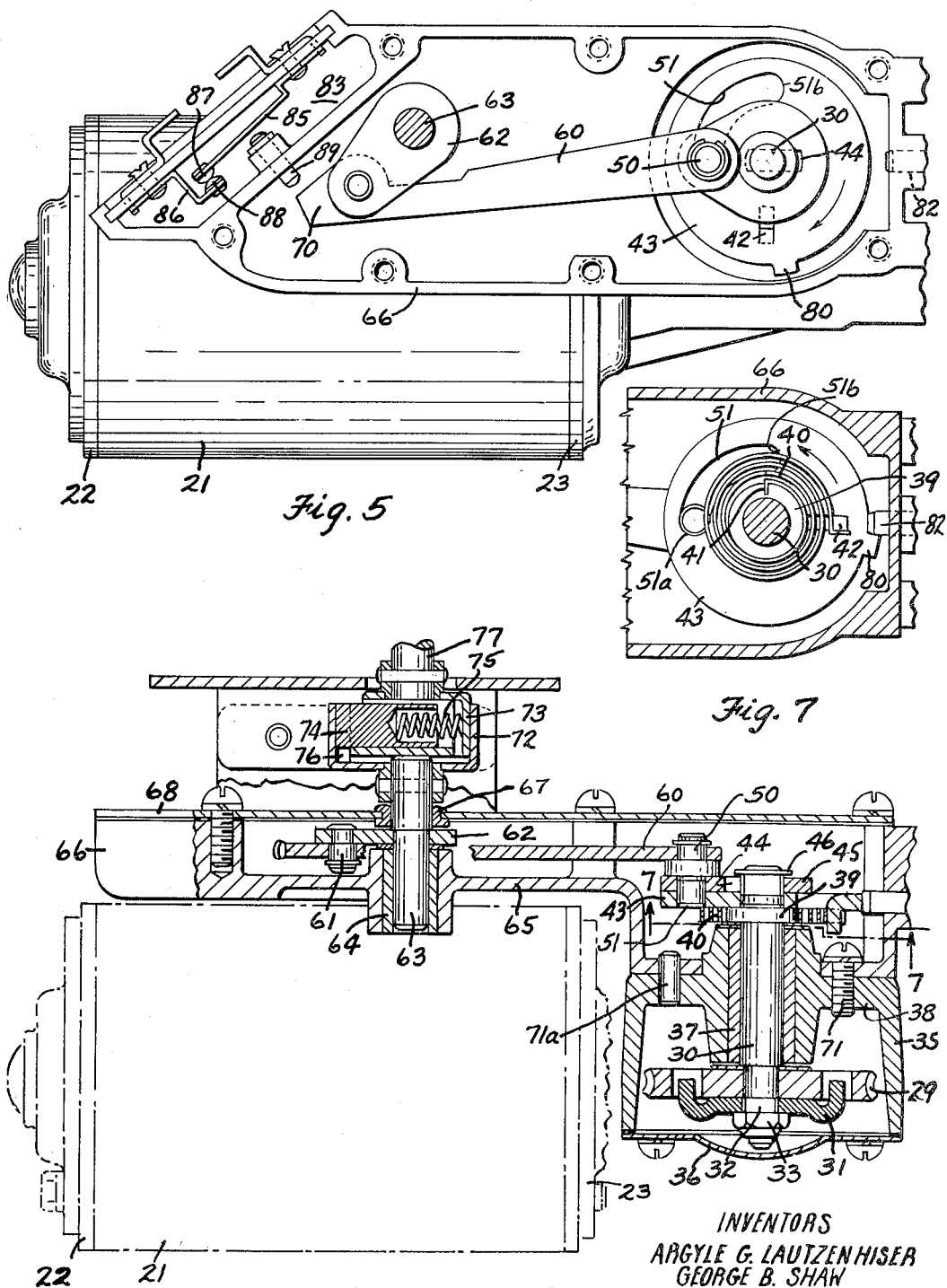
Fig. 5 is a view similar to Fig. 4 showing the motor control switch in the closed position.
Fig. 6 is a sectional view of the driving mechanism and taken on line 6—6 of Fig. 4.
Fig. 7 is a sectional view taken on line 7—7 of Fig. 6.

Referring to the drawings, 20 designates an electric motor having a tubular frame 21 provided with end walls 22 and 23 which support respective bearing assemblies 24 and 25. The end walls are held in assembled relation with the frame 21 by screw 26. The bearings support an armature shaft 27 which includes a worm 28. The worm 28 meshes with a worm gear 29 (in Fig. 6) supported on the lower end of a short shaft 30 and is arranged so that the longitudinal axis thereof extends substantially perpendicular to the longitudinal axis of the shaft 27. The gear 29 is attached to the shaft 30 by a coupling 31 having a hole provided with flat surfaces which receive flat surfaces 32 of the shaft 30. A nut 33 secures the coupling.

The right end of the wall 23, speaking with reference to Fig. 6, is shaped to provide a housing or box 35 which houses the worm 28 and the worm gear 29. The lower end of the box is closed by a closure 36 to prevent escape of lubricant and to exclude foreign matter. The shaft, or rotatable driving member, 30 is journaled in a bearing 37 supported in the wall 38 of the box 35. The upper end of the shaft 30 is provided with a collar 39 which extends through a spiral spring 40, the inner end 41 of the spring is suitably anchored in a slot provided by the collar 39 and the outer end is connected with a lug 42 provided by a cam member 43 which the shaft drives through the spring 40. The upper end of the shaft 30 is provided with flats which fit into an elongated hole 44 in a crank arm, or rotatable driven member, 45. A washer 46 retains the cam member 43 and arm 45 in assembled relation with the shaft 30.

The arm 45 carries a stud, or crank pin, 50, the lower end of which projects with an elongated cam slot 51 formed in the cam member 43. The slot 51 is so formed that radial distance of the end 51b of slot 51 is greater from the axis of shaft 30 than is the radial distance of end 51a, the purpose of which will be described hereinafter. Thus, it may be said that the rotatable driven members, or elements, 43 and 45 are interconnected through a lost motion mechanism comprising cam slot 51 and crank pin 50. The upper end of the stud 50 is connected to one end of a link member 60. The other end of the link 60 is connected by a pin 61 with an oscillating lever 62 attached to a shaft 63 journalled in a bearing 64 supported by a bottom wall 65 of a housing 66 and a bearing 67 supported in a cover 68 for the housing. The link 60 includes a cam portion 70 for operating a switch 83 to be described. The housing 66 is attached to the wall 38 by a screw 71 and located in the desired position by a dowel 71a.

The shaft 63 is connected with a driving member 72 of a torque limiting device having a driven member 73 which supports, for transverse movement, a clutch dog 74 which a spring 75 urges in a recess 76 provided by the clutch driving member 72. The clutch driven member 73 is connected with a shaft 77 with which the windshield wiper blade supporting levers, not shown, are connected.

The cam member 43 is provided with a radial extension or lug 80 adapted to engage a catch or plunger 82 which is capable of extending into the interior of the housing 66. The plunger actuated by a Bowden wire reciprocable in a metal sheath which extends from the dash board, not shown, to the apertured boss which slidably supports the plunger or catch 82.

By manually manipulating a Bowden wire from the dash board, the plunger may be inserted into or out of the path of the lug 80.

The present invention also contemplates the provision of a control for the electric motor 20. This is accomplished by switch 83 connected in a circuit between a current source and the motor 20. The switch as shown in Fig. 4 is preferably mounted at the end of the housing 66. In this instance the switch includes a pair of switch blades 85 and 86 carrying contacts 87 and 88 respectively. The blade 85 is biased so that contact 87 will normally engage contact 88, to complete the circuit to the motor to allow the motor to operate. The blade 85 is adapted to be moved by a plunger 89 to separate contacts 87, 88 when the plunger is engaged by the cam surface 70 on the link 60. The cam is so arranged relative to the movement of the wiping element that when the motor circuit is broken and the motor stops the wiper blades will stop in the park position.

Fig. 13 illustrates a switch structure 90 which is used with the present invention to control two speeds of the motor and controls the position of the plunger 82. The plunger 82 is connected with a preformed sheet metal member 91 movable within a switch case 92 attached to a bracket 93. The bracket 93 is attached to the housing by screws 94 received in tapped holes 94a in extensions 95 formed on the housing 66. The bracket 93 is formed to provide a clamp 96 for receiving one end of a metal sheath or guide tube for a Bowden wire adapted to be connected at 97 with the member 91. The Bowden wire is actuated by a knob, not shown, from the dash board. The member 91 supports a non-conducting contact carrier 98 which carries a bridging member 99 having contact buttons 100 and 101. A spring 102 urges the contacts 100 and 101 toward stationary contacts 103 and 104 carried by an insulating cover 105 for the switch case 92. Electric current may be supplied to the switch from a current source by leads connected to terminal plates 107 and 108 which are connected respectively to stationary contacts 103 and 104.

One method of automobile installation of the windshield wiper actuating mechanism and control mechanism underneath the windshield is shown in Fig. 8. This method consists of two preformed sheet metal parts 110 and 111 attached respectively, by screws 112 and 113 to the motor frame 21 and attached to each other by a screw 114. The part 110 carries a resilient bushing 115, Fig. 1, which receives screws which attach the part 110 to a fixed support.

To place the apparatus in operation, it is necessary to pull the catch 82 out of the path of lug or projection 80. When this is done the spring 40 is unwound to move the cam 43 in a clockwise direction as viewed in Fig. 5, so that the stud 50 will be cammed closer to the axis of shaft thereby causing the link 60 to move to the right. This movement of the link pulls the cam surface 70 away from the plunger 89 to allow the contact 87 on blade 85 to engage contact 88 on blade 86 to close the circuit to energize the motor 20 and cause the motor to operate and rotate the cam member 43 clockwise. As a result the windshield wiper element is oscillated through the normal range of angular movement.

The switching mechanism will now be described with respect to the wiring diagram shown in Fig. 15. As mentioned heretofore the switch 90 includes stationary contacts 103 and 104 and bridging member 99. When the plunger 82 is in the path of projection 80 the switch will be in the position A in Fig. 15. The contacts 103 and 104 are connected across the ends of a resistance 120 by leads 121 and 122 which are connected with leads 123 and 124 respectively. The lead 123 is connected with a field winding 125 of the motor 20 which is a shunt wound motor having armature brushes 126 and 127 connected with a current source 128, such as a battery through the normally closed contacts 86 and 87 of switch 83 and through an ignition switch 129 when the ignition is turned on. When the switch 90 is in position A the bridging member 99 will engage contacts 103, 104 and short circuits the resistance 120 but the motor will not be connected with the source as the switch 83 is open.

When the switch 90 is actuated to position B the bridging member 99 will still engage contacts 103 and 104 the switch 90 is conditioned for slow speed of the motor 20 as the resistance is still short circuited and is in the circuit of the field winding 125 when the ignition switch is closed.

When it is desired to operate the windshield wiper faster, the switch 90 is moved to the position C in Fig. 15 and the following circuit is completed: battery 128, switch 129, switch 83, field 125, resistance 120 and back to battery 128. Since the resistance 120 has been inserted in the circuit of field 125 the motor 20 operates at greater speed.

When it is desired to stop the windshield wiper the switch 90 is actuated to place the plunger 82 in the path of the projection 80 of cam. When the projection engages the plunger 82 the cam 43 stops but the motor continues to rotate until the pin engages end 51b of cam slot 51. When the crank pin 50 engages edge 51b of the cam slot, the length of the crank arm 45 is increased by an amount equal to the difference in the radii between ends 51a and 51b of the slot 51. The increased length of the crank arm necessarily increases its throw so that oscillation of a greater amplitude is imparted to the shaft 63 through the connecting rod, or link, 60. Thus, it may be said that, inasmuch as shafts 30 and 63 are interconnected by a linkage constituted by the crank arm 45 and the link 60, this linkage is of variable length depending upon the radial distance of crank pin 50 from the shaft 30. During the movement of the pin from end 51a to 51b of slot 51 the spring 40 is being wound up and placed under tension. When the pin engages end 51b the link 60 will be positioned to cause the cam surface 70 to engage plunger 89 to separate contacts 86, 87, thus causing the motor to stop and place the wiper blades in parked position.

When starting the wiper, the plunger 82 is moved out of the path of lug 80 permitting the spring to unwind to rotate the cam until end 51a of slot engages the pin to unpark the blades and move the pin against the end 51a of slot 51 whereupon the link 60 moves cam 70 away from plunger to allow blade 85 to move under its own resiliency.

While the embodiment of the present invention as herein disclosed, constitutes a preferred form, it is to be understood that other forms might be adopted.

What is claimed is as follows:

1. Windshield wiper actuating mechanism including, a unidirectional rotatable driving member, a driven element rotatably journaled on and yieldably coupled to said driving member, a wiper actuating driven member, means interconnecting said driving and driven members including a linkage of variable length, and means whereby stopping rotation of said yieldably coupled driven element varies the length of said linkage.

2. A variable length linkage mechanism for actuating a windshield wiper blade including, in combination, a rotatable shaft, a member connected to rotate with said shaft but adapted for radial movement relative thereto, a link pivotally mounted upon said member, a second member rotatably journaled on and yieldably coupled to said shaft, a lost motion mechanism interconnecting said two members including a pin and cam surface, said cam surface being of varying radial distance from the axis of said second member, and means for effecting relative movement between said first and second members.

3. Windshield wiper actuating and control mechanism including, in combination, an electric motor, a shaft operatively connected to and driven thereby, a first rotatable element yieldably connected to said shaft, a wiper actuating member, a second element of variable length connected to rotate with said shaft, said first and second elements being operatively interconnected, a link connecting said second element with said wiper actuating member, switch means normally biased to the closed position to energize said motor, said link being operatively associated with said switch means whereby opening movement thereof is effected by said link when it is extended by said second element, and means whereby effecting relative movement between said first and second elements varies the length of said second element so as to simultaneously open said switch means and impart a greater movement to said wiper actuating member.

4. Windshield wiper actuating and control mechanism including, in combination, an electric motor, a shaft operatively connected to and driven thereby, a driven element rotatably journaled on and yieldably coupled to said shaft, means for actuating the wiper, a second element of variable length connected to rotate with said shaft but adapted for radial movement relative thereto, a link connecting said second element with the wiper actuating means, a lost motion mechanism interconnecting said elements, switch means normally biased to the closed position to energize said motor, said link being operatively associated with said switch means whereby opening movement thereof is effected by said link when it is extended by said second element, and means including said lost motion connection for effecting relative movement between said first and second element to vary the length of said second element so as to simultaneously open said switch means and impart a greater movement to said wiper actuating means.

5. Windshield wiper actuating mechanism including, a rotatable crank arm having a variable length, an oscillatable driven member, a link interconnecting the crank arm and the driven member whereby rotation of the crank arm will impart oscillation to the driven member, a rotatable driven member, means including a torsion device interconnecting the crank arm and the rotatable driven member whereby relative movement between the driving crank and the rotatable driven member causes variation in the length of the crank arm so as to vary the amplitude of oscillation imparted to said oscillatable driven member, and means operable to arrest rotation of said rotatable driven member so as to cause relative movement between said driving crank and said rotatable driven member to control the amplitude of oscillation imparted to said oscillatable driven member.

6. Windshield wiper actuating mechanism including, a rotatable driving member, a rotatable driven element yieldably coupled to said driving member, an oscillatable driven member, means interconnecting said driving and driven members including a crank arm of variable length whereby rotation of the driving member will impart oscillation to said driven member, said crank arm being connected at all times to said driving member for rotation therewith, and means whereby effecting relative rotation between said yieldably coupled driven element and said driving member about the axis of the said driving member varies the length of said crank arm so as to vary the amplitude of oscillation imparted to said driven member.

7. Windshield wiper actuating mechanism including, a unidirectional rotatable driving member, a driven element rotatably journaled on and yieldably coupled to said driving member, an oscillatable driven member, means interconnecting said driving and driven members including a crank arm of variable length whereby rotation of said driving member will impart oscillation to said driven member, and means whereby arresting rotation of said yieldably coupled driven element varies the length of said crank arm so as to vary the amplitude of oscillation imparted to said driven member.

8. Windshield wiper actuating and control mechanism including, in combination, an electric motor connected to a rotatable shaft, a rotatable driven element yieldably coupled to said shaft, an oscillatable wiper actuating member, means interconnecting said shaft and said wiper actuating member including a linkage of variable length whereby rotation of said shaft will impart oscillation to said wiper actuating member, switch means normally biased to the closed position for energizing said motor, said variable length linkage being operatively associated with said switch means whereby opening movement thereof is effected by said linkage when it is of maximum length, and means whereby effecting relative movement between said yieldably coupled driven element and said shaft extends the length of said linkage so as to simultaneously impart oscillation of greater amplitude to said wiper actuating member and open said switch means to deenergize said motor.

9. Windshield wiper actuating and control mechanism including, in combination, an electric motor connected to a rotatable shaft, a driven element rotatably journaled on and yieldably coupled to said shaft, an oscillatable wiper actuating member, means including a variable length linkage interconnecting said shaft and said wiper actuating member whereby rotation of said shaft will impart oscillation to said wiper actuating member, said variable length linkage including a crank arm connected to rotate with said shaft but adapted for radial movement relative thereto, a lost motion mechanism interconnecting said driven element and said crank arm, a switch normally biased to the closed position for energizing said motor, said variable length linkage being operatively associated with said switch whereby opening movement thereof is effected by said linkage when it is of maximum length, and means including said lost motion mechanism for effecting relative movement between said element and said crank arm so as to extend the length of said linkage and thereby simultaneously impart oscillation of greater amplitude to said wiper actuating member and open said switch to deenergize said motor.

10. Windshield wiper actuating mechanism including, a rotatable driving member, a wiper actuating driven member, means interconnecting said driving and driven members, said means including a first element rotatably journaled on and yieldably coupled to said driving member, a second element of variable effective length connected to rotate with said driving member but adapted for radial movement relative thereto, lost motion means interconnecting said two elements, and a link connecting said second element with said driven member, and means including said lost motion means for varying the effective length of said second element.

11. Windshield wiper actuating mechanism including, a rotatable driving member, a wiper actuating driven member, means interconnecting said driving and driven members, said means including a first element yieldably coupled to said driving member, a second element of variable effective length connected to rotate with said driving member but adapted for radial movement relative thereto, a lost motion mechanism including a pin and slot interconnecting said two elements, and a link connecting said pin with said driven member, and means including said lost motion mechanism whereby arresting rotation of said first element varies the effective length of said second element.

12. In a windshield wiper having a wiper element adapted to be oscillated over the surface of a windshield and to be parked beyond the normal range of its oscillation, an actuating mechanism including in combination, means for actuating the wiper element, a pair of rotatable elements, one of said elements having a variable effective length, a link interconnecting said variable effect length element and said actuating means whereby rotation of said one element will impart oscillation to said actuating means, a lost motion connection between said rotatable elements whereby relative rotative movement therebetween varies the effective length of said one element, said lost motion connection including a pin connected to said one element and a cam slot in the other of said elements of varying radial distance from the axis thereof, one end of said pin being operatively associated with said cam slot, and means operable to effect relative rotative movement between said elements so as to control the effective length of said one element and thereby vary the amplitude of oscillation imparted to said actuating means.

References Cited in the file of this patent

UNITED STATES PATENTS

| | | |
|---|---|---|
| 2,079,573 | Lauer | July 21, 1933 |
| 2,232,480 | Schmid | Feb. 18, 1941 |
| 2,308,212 | Scott-Iverson et al. | Jan. 12, 1943 |
| 2,452,496 | Schneider | Oct. 26, 1948 |
| 2,484,781 | Coffey | Oct. 11, 1949 |
| 2,513,247 | Morton | June 27, 1950 |
| 2,598,951 | Weigele | June 3, 1952 |

FOREIGN PATENTS

| | | |
|---|---|---|
| 499,082 | Great Britain | Jan. 18, 1939 |
| 45,871 | Sweden | Oct. 15, 1917 |